Sept. 3, 1940.  G. WETMORE ET AL  2,213,600
SEED PLANTER AND CULTIVATOR
Filed July 21, 1937  2 Sheets-Sheet 1

INVENTORS
George Wetmore and
Frederick Roll
BY
A. B. Bowman
ATTORNEY.

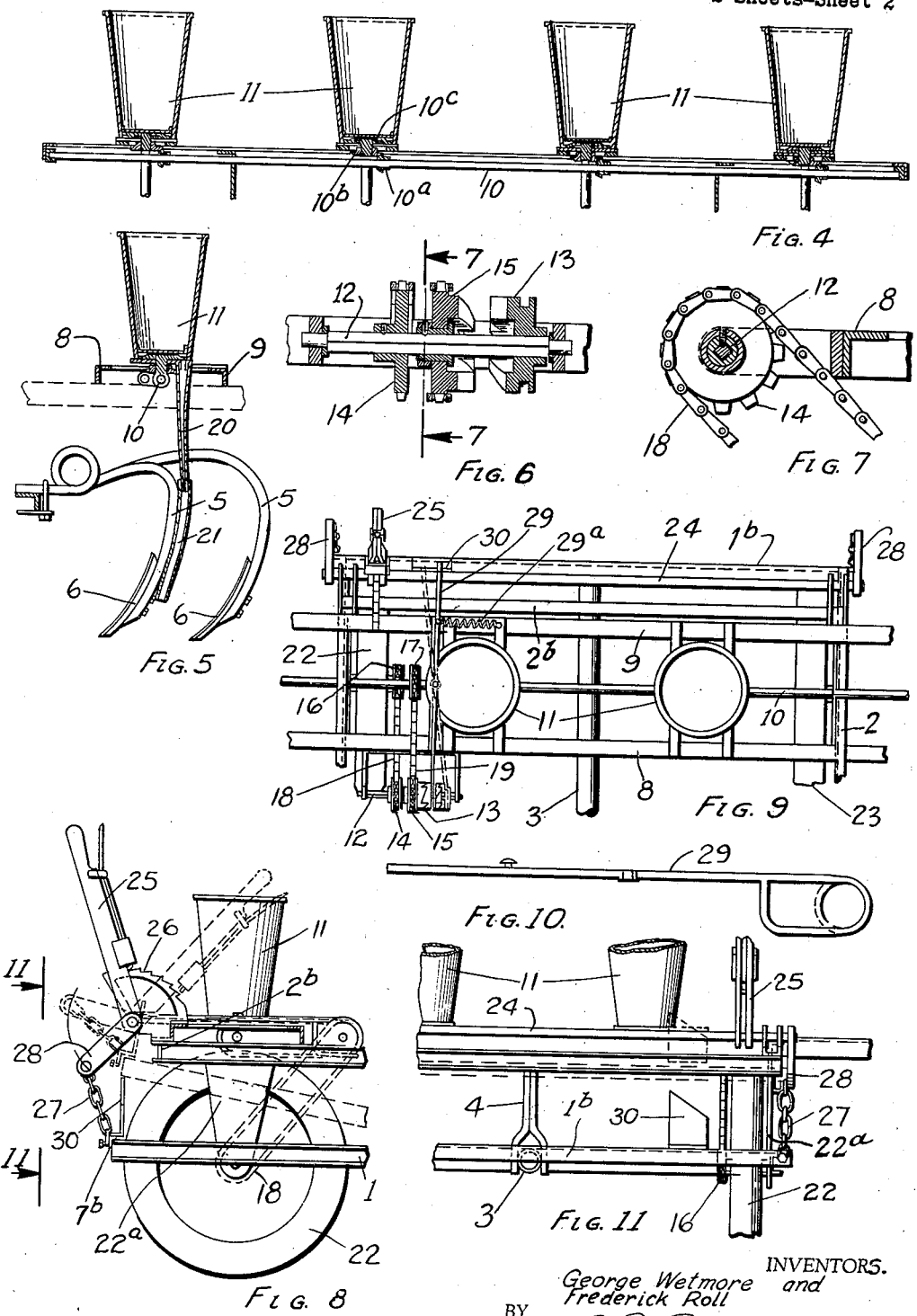

Patented Sept. 3, 1940

2,213,600

UNITED STATES PATENT OFFICE 2,213,600

SEED PLANTER AND CULTIVATOR

George Wetmore and Frederick Roll, Otay Mesa, Calif.

Application July 21, 1937, Serial No. 154,792

7 Claims. (Cl. 111—67)

Figure 1:
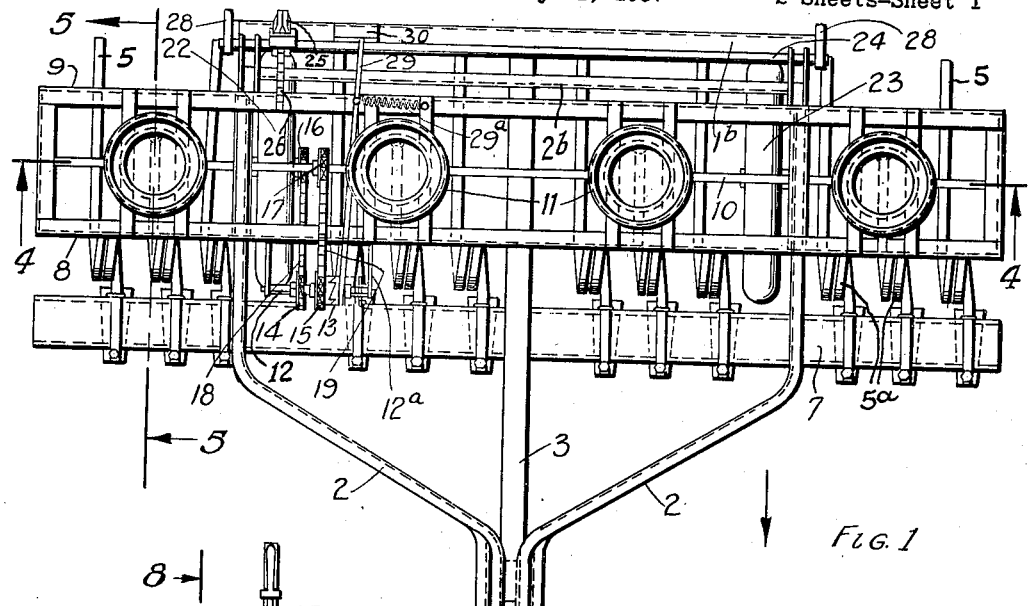
Figure 2:
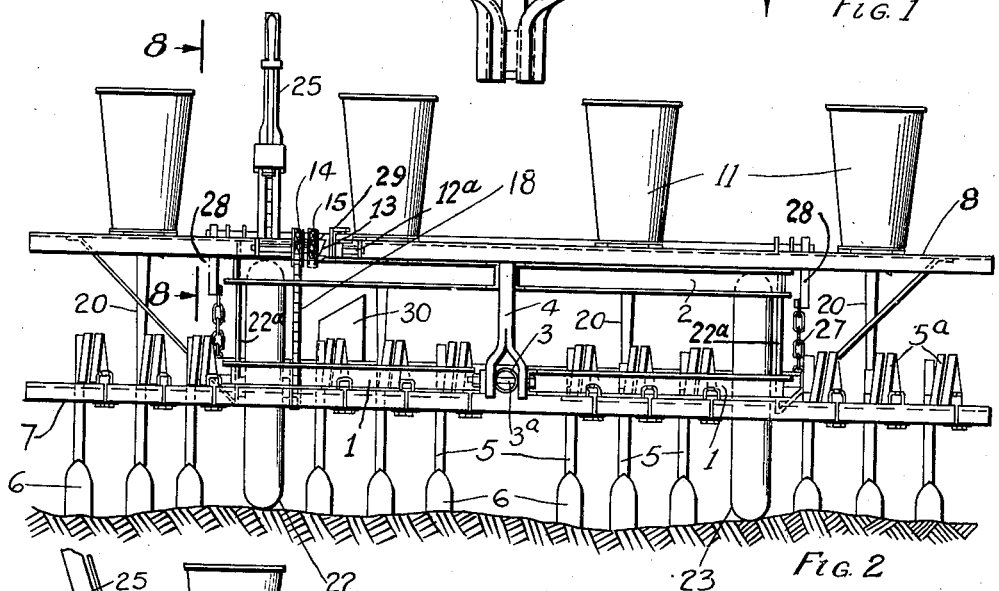
Figure 3:
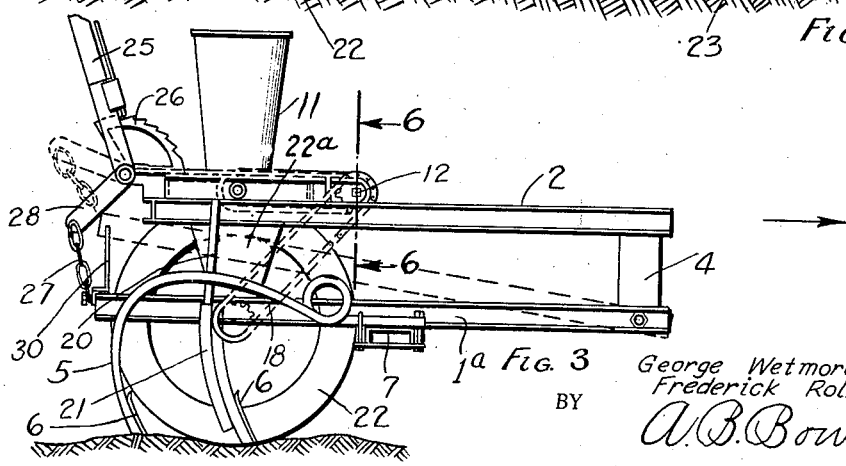

Our invention relates to a seed planter and cultivator for planting seed in rows and cultivating the ground at the same time, and the objects of our invention are:

First, to provide a seed planter in which a multiplicity of rows may be planted at one time and which planter is so constructed so that seed may be planted the depth desired in relatively hard ground;

Second, to provide a seed planter and cultivator in which the seed is covered thoroughly after it is deposited in the row in the ground;

Third, to provide a seed planter and cultivator of this class in which the seed is planted in rows and the ground cultivated thoroughly between the rows simultaneously with the planting;

Fourth, to provide a seed planter of this class which is so constructed that the seed may be planted to any desired depth and will maintain such depth regardless of the planter passing over hard spots of ground;

Fifth, to provide a seed planter and cultivator of this class which will operate practically without disarrangement in ground where there are large stones or objects of interference;

Sixth, to provide a seed planter of this class in which the seed conductor and shovel for making the furrow are yieldably supported;

Seventh, to provide a seed planter and cultivator of this class in which the cultivator and furrowing shovels may be raised from the ground and simultaneously the seeder is stopped;

Eighth, to provide a seed planter and cultivator of this class which is very efficent in its action, easy to operate, easy to manufacture, and which will not readily deteriorate or get out of order;

With these and other objects in view as will appear hereinafter, our invention consists of certain novel features of construction, combination, and arrangement of parts and portions as will be hereinafter described in detail and particularly set forth in the appended claims, reference being had to the accompanying drawings and to the characters of reference thereon which form a part of this application in which:

Figure 1 is a top or plan view of our cultivator complete in operating position showing some of the parts fragmentarily; Fig. 2 is a front elevational view thereof showing some of the parts fragmentarily; Fig. 3 is an end elevational view thereof showing some of the parts fragmentarily; Fig. 4 is a fragmentary longitudinal sectional view of the seed control mechanism and hoppers taken from the line 4—4 of Fig. 1; Fig. 5 is a fragmentary transverse sectional view of the seeder and planter taken from the line 5—5 of Fig. 1; Fig. 6 is a fragmentary enlarged sectional view of the counter shaft taken from the line 6—6 of Fig. 3; Fig. 7 is a sectional view thereof taken from the line 7—7 of Fig. 6; Fig. 8 is a fragmentary transverse sectional view from the line 8—8 of Fig. 2 showing the raised positions of the cultivator supports by dash lines; Fig. 9 is a fragmentary top view similar to that of Fig. 1 and showing the shifted position of the clutch and clutch lever by dash lines; Fig. 10 is a detailed side elevational view on an enlarged scale of the clutch shifting lever; Fig. 11 is a fragmentary rear elevational view of one end with the cultivator springs and shovels omitted.

Similar characters of reference refer to similar parts and portions throughout the several views of the drawings:

The lower frame member 1, upper frame member 2, tongue member 3, frame connecting member 4, cultivator springs 5, cultivator shovels 6, cultivator spring supporting beam 7, seed hopper supporting beams 8 and 9, seed hopper shaft 10, seed hoppers 11, counter shaft 12, clutch 13, sprockets 14, 15, 16, and 17, chains 18 and 19, seed conducting tubes 20 and 21, wheels 22 and 23, shovel shifting shaft 24, shovel shifting lever 25, shovel shifting lever ratchet 26, shovel shifting chains 27, shovel shifting arms 28, clutch shifting lever 29, and clutch shifting cam 30 constitute the principal parts and portions of our seed planter and cultivator.

The lower frame member 1 is preferably made of channel beams 1a on the rear end of which is supported a longitudinal angle member 1b shown best in Fig. 9 of the drawings, and the front ends of the members 1a converge toward each other and are secured on opposite sides of the bifurcated end of the frame connecting member 4 shown best in Fig. 2 of the drawings, the bifurcated portion of the frame member 4 straddling the tongue member 3, and all secured together by means of the bolt 3a shown best in Fig. 2 of the drawings. The upper frame member 2 is similarly shaped and constructed. However, instead of an angle bar extending along the rear side, a channel member 2b extends longitudinally and connects the rear ends of the members while the front portion is secured by welding or otherwise to the shank portion of the frame connecting member 4 shown best in Fig. 2 of the drawings. Thus the frame member 2 is rigidly secured to the connecting support 4 while the frame member 1 is pivotally connected with said support 4 which permits the raising of the rear portion of the lower frame member 1 as shown by dotted lines in Fig. 8 of the drawings. This tongue member 3 is supported at its rear end on the channel member 1b by welding or otherwise. Secured on the lower side of the lower frame member 1 and extending longitudinally of the planter and cultivator is the cultivator spring supporting beam 7 which is rigidly connected to this frame member and to the tongue member 3, thus providing a rigid frame member which is pivotally connted at its front end by means of the bolt 3a so that it may be raised and lowered at its rear side. Secured on this beam 7 is a plurality of cultivator springs 5 which are preferably square in cross section and substantially one inch square and each provided with a double loop 5a, thus providing a coil spring shovel support, thus providing substantially stiff but yieldable shovel supports. On the extended ends of these supports 5 are the shovels 6 which are preferably double ended shovels to provide for their reversal.

It will be noted that the springs positioned directly under the hoppers 11 are relatively shorter than those on opposite sides thereof, which is shown best in Fig. 5 of the drawings so that the alternate shovels are positioned in staggered relation forwardly and backwardly. Secured to the shorter shovel supports at the back sides are the seed conducting tubes 21 which extend downwardly to a position intermediate the upper and lower sides of the shovel so that the seed will be deposited in the furrow immediately behind the shovel and connecting with the upper end of these tubes 21 and telescopically mounted therein are the lower ends of the seed conducting tube 20 which are flexible to permit the movement of the cultivator springs 5 relatively to the hoppers 11. All this is shown best in Fig. 5 of the drawings.

Applicants have provided in their preferred form four hoppers for receiving the seed to be planted and the seed is deposited from the hopper by conventional revolving means operated by the shaft 10 through pinions 10a and bevel gears 10b which connect with dropper plates 10c which are provided with openings which are adapted to communicate with the upper ends of the flexible tubes 20 so that the seed is dropped with the revolution of the shaft 10 through the tubes 20 and 21 into the furrows provided by the shovels 6 on the shorter cultivator springs 5 and following are the longer cultivator springs which cultivate the ground on opposite sides of the furrow in which the seed is planted as well as cover the seed thoroughly immediately after the seed is dropped in position in the furrow.

Secured to the inner sides of the backwardly extending side members of the upper frame 2 are wheel supporting brackets 22a which extend downwardly some distance adjacent the inner side of the lower frame member 1 and are provided on their lower ends with inwardly directed axle portions on which the wheels 22 and 23 are revolubly mounted. These wheels 22 and 23 are preferably provided with pneumatic tires. These brackets 22a form guides for the lower frame member 1 when it is shifted upwardly and downwardly for raising and lowering the shovels.

Secured in connection with the axle of the wheel 22 is a sprocket 16 on which is mounted a sprocket chain 18. This sprocket chain 18 is also mounted on a sprocket 14 which is secured on the countershaft 12. This countershaft 12 is supported by a bracket 12a secured to the front seed hopper supporting beam 8 and extending forwardly therefrom. Also mounted on this countershaft 12 is another sprocket 15 which is connected with one member of the clutch 13 and is revoluble on the countershaft 12. Mounted on the sprocket 15 is a chain 19 which is also mounted on a sprocket 17 secured on the seed hopper shaft 10. Mounted on this countershaft 12 is another portion of the clutch member 13 which is keyed thereto but shiftable longitudinally thereon for connecting and disconnecting the countershaft with the shaft 10 through the sprockets 15 and 17 and chain 19. This shiftable clutch member is operated by means of a lever 29 which is pivotally supported intermediate its ends and its opposite end is positioned to engage a cam member 30 which is an incline cam member and adapted to shift the lever 29 upon its pivotal mounting for drawing the clutch 13 into and out of operating position with the raising and lowering of the cam member 30. This cam member 30 is secured on the angle member 1b and adapted to be moved into engaging relation with the extended end of this lever 29.

Secured to the extended ends of this angle member 1b are the shovel shifting chains 27 which are connected with arms 28 which are supported on the shovel shifting shaft 24 at its opposite ends. Secured to this shaft 24 is the shovel shifting lever 25 which is conventional in form and adapted to engage the ratchet 26 for raising and lowering the rear end of the frame member 1 as shown best by dash and solid lines in Fig. 8 of the drawings.

The operation of our seed planter and cultivator is substantially as follows: The seed is placed in the hopper 11 and the tongue 3 or frame connecting member 4 is connected to a tractor hitch or other propelling mechanism, the lever 25 is positioned backwardly so that the lower frame member 1 is lowered and there is sufficient weight in the cultivator springs together with the slant of the shovels so that the shovels dig furrows into the ground keeping the chain 27 substantially taut at all times so that the depth of the shovel may be regulated by the lever 25 and ratchet 26. Thus the planter is securely supported upon the wheels 22 and 23 while the lower frame member and shovels are free to shift relatively thereto. With the operation of the wheel 22, the countershaft 12 is revolved and when the lower frame member 1 is in the lowered position as shown by solid lines in Fig. 3 of the drawings, the clutch operating lever 29 has shifted the shiftable clutch member into position by action of the spring 29a. Thus with the revolution of the countershaft 12, the shaft 10 is operated and the seed is dropped from the hopper through the tubes 20 and 21 into the furrows back of the shorter shovel supporting springs 5 and the longer shovel supporting springs with the shovels cultivate the ground on opposite sides of the furrow and thoroughly cover the seed. When the lower frame 1 is raised, however, the cam 30 engages the end of the lever 29 and shifts it shifting the shiftable clutch member out of engagement so that the sprocket 15, chain 19, and sprocket 17 are not in connection with the countershaft and therefore do not operate. It is obvious that the same time the seed is planted the ground is throughly cultivated and the seed thoroughly covered. It is also obvious that the ground may be cultivated with the cultivator shovels without operating the seeder.

Though we have shown and described a particular construction, combination, and arrangement of parts and portions, we do not wish to be limited to this particular construction, combination and arrangement, but desire to include in the scope of our invention the construction, combination, and arrangement substantially as set forth in the appended claims.

Having thus described our invention, what we claim as new and desire to secure by Letters Patent is:

1. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs and seed conducting tubes yieldably supported on a portion of said forward row of springs and connected therewith and extending near their extended ends and means to feed seed into said tubes.

2. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs, seed conducting tubes yieldably supported on a portion of said forward row of springs and connected therewith and extending near their extended ends, and hopper means supported on said upper frame adapted to feed seed into said conducting tubes at their upper ends.

3. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs, seed conducting tubes yieldably supported on a portion of said forward row of springs and connected therewith and extending near their extended ends, hopper means supported on said upper frame adapted to feed seed into said conducting tubes at their upper ends, and means for tilting said lower frame on its pivotal mounting and thereby raising all of said springs and shovels.

4. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs, seed conducting tubes yieldably supported on a portion of said forward row of springs and connected therewith and extending near their extended ends, hopper means supported on said upper frame having feeding means adapted to feed seed into said conducting tubes at their upper ends, means for tilting said lower frame on its pivotal mounting and thereby raising all of said springs and shovels, and cam, lever and clutch means in connection with said raising means for stopping said feeding means when the springs and shovels are raised.

5. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs, seed conducting tubes yieldably supported on a portion of said forward row of springs and connected therewith and extending near their extended ends, hopper means supported on said upper frame having feeding means adapted to feed seed into said conducting tubes at their upper ends, means for tilting said lower frame on its pivotal mounting and thereby raising all of said springs and shovels, cam, lever and clutch means in connection with said raising means for stopping said feeding means when the springs and shovels are raised, said seed conductors including two telescopically mounted yieldable members.

6. In a seed planter and cultivator, an upper frame provided with front and back sides and opposite ends, wheels positioned on axles intermediate said front and back sides and directed inwardly of said opposite ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supporting bar in alternate relation forming a forward row and a back row engageable with the ground, shovels supported on the extended ends of said springs and seed conductors yieldably supported on a portion of said forward row of springs and connected therewith and extending near their extended ends, said springs shaped to form beams and provided with convolutions near their supported ends and means to feed seed into said seed conductors.

7. In a seed planter and cultivator, an upper frame provided with front and back sides and opposite ends, wheels positioned on axles intermediate said front and back sides and directed inwardly of said opposed ends, a lower frame pivotally connected with said upper frame at the front side of said lower frame and suspended from said upper frame at the back side of said lower frame back of said wheels, a single spring supporting bar on the front portion of said lower frame adjacent the front side of said wheels, a pair of rows of varying length springs secured to the spring supported bar in alternate relation forming a forward row and a back row engageable with the ground, shovels supported on the extended ends of said springs, seed conductors yieldably supported on a portion of said forward row of springs and connected therewith and extending near their extended ends, hopper means supported on said upper frame having feeding means adapted to feed seed into said conductors at their upper ends, said feeding means including sprockets, chains and shafts connected with the wheels.

GEORGE WETMORE.
FREDERICK ROLL.